US011748520B2

United States Patent
K et al.

(10) Patent No.: US 11,748,520 B2
(45) Date of Patent: Sep. 5, 2023

(54) PROTECTION OF A SECURED APPLICATION IN A CLUSTER

(71) Applicant: Dell Products L.P., Round Rock, TX (US)

(72) Inventors: Krishnaprasad K, Bengaluru (IN); Gobind Vijayakumar, Trichy (IN); Murugan Sekar, Tindivanam (IN)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 17/083,002

(22) Filed: Oct. 28, 2020

(65) Prior Publication Data

US 2022/0129591 A1    Apr. 28, 2022

(51) Int. Cl.
*G06F 21/72* (2013.01)
*G06F 9/455* (2018.01)
*G06F 21/57* (2013.01)
*G06F 21/60* (2013.01)

(52) U.S. Cl.
CPC .......... *G06F 21/72* (2013.01); *G06F 9/45533* (2013.01); *G06F 21/57* (2013.01); *G06F 21/602* (2013.01)

(58) Field of Classification Search
CPC ...... G06F 21/72; G06F 9/45533; G06F 21/57; G06F 21/602
See application file for complete search history.

(56) References Cited

U.S. PATENT DOCUMENTS

| 2007/0094719 | A1* | 4/2007 | Scarlata | G06F 21/552 726/9 |
| 2011/0154500 | A1* | 6/2011 | Sahita | G06F 21/57 726/26 |
| 2012/0159634 | A1* | 6/2012 | Haikney | G06F 9/4856 726/25 |
| 2015/0135311 | A1* | 5/2015 | MacKintosh | G06F 21/577 726/22 |
| 2016/0350534 | A1* | 12/2016 | Poornachandran | H04L 9/3273 |
| 2019/0362083 | A1* | 11/2019 | Ortiz | G06F 21/57 |

* cited by examiner

*Primary Examiner* — Theodore C Parsons
*Assistant Examiner* — Alan L Kong
(74) *Attorney, Agent, or Firm* — Jackson Walker L.L.P.

(57) ABSTRACT

An information handling system may include at least one processor; and a memory coupled to the at least one processor. The information handling system may be configured to: execute an application on the at least one processor, wherein at least a portion of data of the application is stored encrypted in a secure enclave region of the memory; and securely transfer execution of the application to a second information handling system by: transmitting platform configuration register (PCR) measurement data to the second information handling system; and transmitting the data of the application to the second information handling system; wherein the PCR measurement data is usable by the second information handling system to perform a remote attestation, the remote attestation including verification of the PCR measurement data to confirm that the data of the application has not been changed.

14 Claims, 5 Drawing Sheets

PROTECTION OF A SECURED APPLICATION IN A CLUSTER

TECHNICAL FIELD

The present disclosure relates in general to information handling systems, and more particularly to protection of a secured application in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers.

Certain types of processors incorporate features for protecting application security from malicious attacks. For example, many INTEL® processors include Software Guard Extensions (SGX) features. Such processors may include a special set of instructions for securing applications and/or data by creating isolated memory regions from the physical memory address space. These address spaces (referred to as enclaves) are marked as protected memory regions where the application can run more securely in a trusted space. Any attempt to access these trusted spaces from outside of the process is denied by the processor. Further, if the application's process is terminated or the system is rebooted, the protected memory region is cleared. (Although various embodiments are described herein with respect to SGX, one of ordinary skill in the art with the benefit of this disclosure will understand that other processor security features may be used in lieu of or in addition to SGX.)

To preserve data stored in the protected memory region, the data may be transferred out of the trusted enclave into an untrusted memory region. This will be an insecure operation, however, and to prevent it from occurring, SGX uses a concept called data sealing where it encrypts (either using MRENCLAVE or MRSIGNER policies) the data in the protected memory region with the help of a key generated by the processor. The application running on the trusted region space may then be safely exported to an untrusted region, ensuring that the data is not manipulated/modified/copied to another system. This encrypted data can be decrypted only on the same enclave (MRENCLAVE) or on two different enclaves (MRSIGNER) on the same system, based on the policy type.

With both of the policies mentioned above, it is not possible to access the application or decrypt the data if a virtual machine (VM) hosted on the primary machine is migrated to another machine, even if it has same hardware that supports the SGX instruction sets. Even though this feature protects the data, it comes with limitations. For example, in a cloud/container datacenter environment, it is not possible to move an application across multiple hosts where high availability is paramount.

Accordingly, embodiments of this disclosure may provide techniques usable for securely migrating an application from one physical information handling system to another.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with protection of secured applications may be reduced or eliminated.

In accordance with embodiments of the present disclosure, an information handling system may include at least one processor; and a memory coupled to the at least one processor. The information handling system may be configured to: execute an application on the at least one processor, wherein at least a portion of data of the application is stored encrypted in a secure enclave region of the memory; and securely transfer execution of the application to a second information handling system by: transmitting platform configuration register (PCR) measurement data to the second information handling system; and transmitting the data of the application to the second information handling system; wherein the PCR measurement data is usable by the second information handling system to perform a remote attestation, the remote attestation including verification of the PCR measurement data to confirm that the data of the application has not been changed.

In accordance with these and other embodiments of the present disclosure, a method may include an information handling system executing an application on at least one processor of the information handling system, wherein at least a portion of data of the application is stored encrypted in a secure enclave region of a memory of the information handling system; and the information handling system securely transferring execution of the application to a second information handling system by: transmitting platform configuration register (PCR) measurement data to the second information handling system; and transmitting the data of the application to the second information handling system; wherein the PCR measurement data is usable by the second information handling system to perform a remote attestation, the remote attestation including verification of the PCR measurement data to confirm that the data of the application has not been changed.

In accordance with these and other embodiments of the present disclosure, an article of manufacture may include a non-transitory, computer-readable medium having computer-executable code thereon that is executable by a processor of an information handling system for: executing an application on the processor, wherein at least a portion of data of the application is stored encrypted in a secure enclave region of a memory of the information handling system; and securely transferring execution of the application to a second information handling system by: transmitting platform configuration register (PCR) measurement data to the second information handling system; and transmitting the data of the application to the second information handling system; wherein the PCR measurement data is usable by the second information handling system to perform a remote attestation, the remote attestation including verification of the PCR measurement data to confirm that the data of the application has not been changed.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
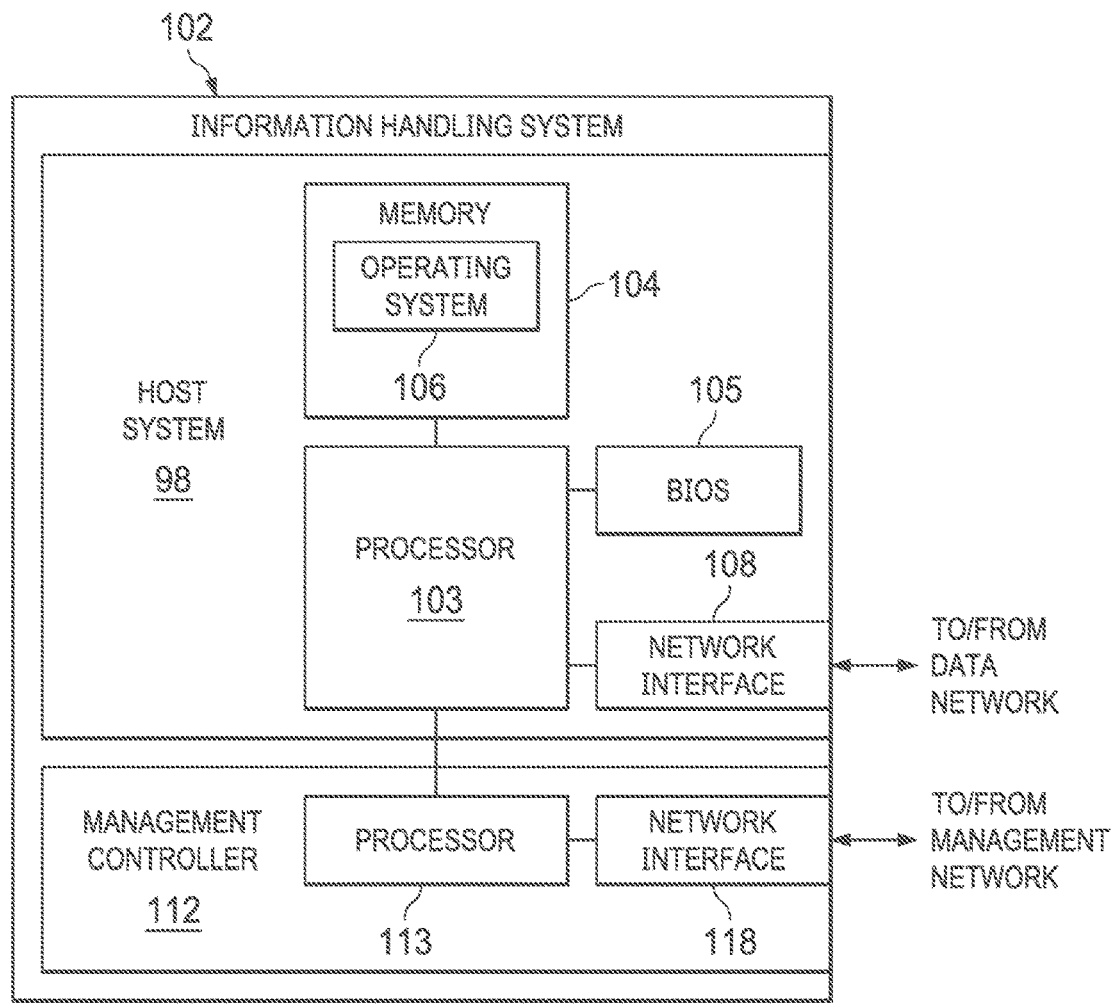
FIG. 1 illustrates a block diagram of an example information handling system, in accordance with embodiments of the present disclosure.

Preferred embodiments and their advantages are best understood by reference to FIGS. 1 through 7, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system (OS) 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to be able to securely migrate an application from one physical information handling system (also referred to herein as a node) to another, particularly in the context of HCI clusters.

Figure 2:
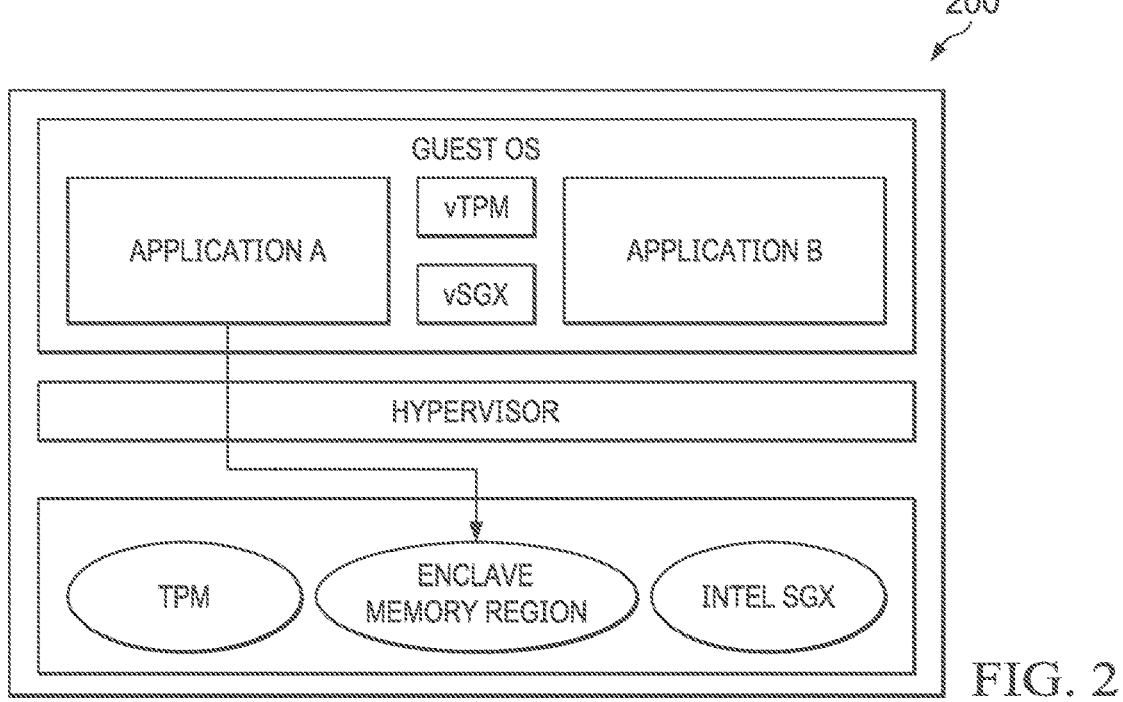
FIG. 2 illustrates a block diagram of an example information handling system, in accordance with embodiments of the present disclosure.

FIG. 2 provides a block diagram of an example node, according to some embodiments. As shown, a guest OS executes via a hypervisor. Within the guest OS, one or more applications (two in this example) may run, and they may access a secure enclave memory region, as discussed in further detail below. In some embodiments, node 200 may include hardware support for a cryptoprocessor such as a Trusted Platform Module (TPM) chip, as well as SGX features implemented in a processor of node 200. In some embodiments, a virtual TPM (vTPM) may also be implemented. In these and other embodiments, both the physical TPM (pTPM) and the vTPM may be used for techniques according to the present disclosure.

In some embodiments, migration of an application may be accomplished by providing a remote attestation that the secured application is indeed untampered and can be safely loaded into the MRENCLAVE region. This may be accomplished by extending the instruction sets from the hypervisor to the guest OS and performing a remote attestation on the host where the VM will migrate to. The remote attestation may be performed with a TPM. (Various examples herein are described with respect to a TPM, but one of ordinary skill in the art with the benefit of this disclosure will understand that other cryptoprocessors may be used in some embodiments.) Some embodiments thus contemplate the use of a TPM remote attestation procedure, as well as a mechanism by which virtualized containers/operating systems can securely move across a datacenter network. A high-level explanation of an example procedure according to this disclosure may aid in understanding. To that end, the following example situation is provided.

1) Three servers are configured in a cluster, and they implement the OS/BIOS support to identify SGX command sets. All the servers in the cluster are SGX-aware, and a handshake is performed during creation of the cluster.

2) This handshake may in some embodiments be performed periodically by the hypervisor, maintaining the secure zone for critical applications. (This is explained in more detail below with regard to secure handshake initialization).

3) The hypervisor may inform the system BIOS regarding the address space where the enclave should be created based on a mapping from the VM guest virtual address to the VM physical address to the hypervisor virtual address space to the physical address space.

4) The hypervisor may create a secure MRENCLAVE region dynamically when virtual machines are created. This region may be user-configurable based on the application's memory requirements, and the configuration of the region may also be dynamic. The BIOS may configure the enclave memory based on the application's memory requirement as requested. An Advanced Configuration and Power Interface (ACPI) method such as an Operating System Capabilities (OSC) method may also be defined to create an enclave dynamically.

5) Once the VMs detect the support of SGX, all applications constructed with this framework may use the secure MRENCLAVE region.

6) When an application executing on VM-A on Node A requests the MRENCLAVE region, the hypervisor may provide access, and all application memory may then be protected in Node A.

7) At this point, the application resides in a secure MRENCLAVE region in Node A, and at some point it may be desirable to migrate it to Node B.

8) When the migration is initiated, the hypervisor may initiate a remote attestation workflow, and if the attestation is successful, it will migrate the virtual machine to Node B into a secure enclave before loading the container/virtual machine on Node B. (This is explained in more detail below with regard to the secure handshake attestation protocol.)

As discussed in the example above, some embodiments use a TPM to provide the remote attestation between the two hosts. The TPM key attestation provides the ability of the entity requesting a certificate to cryptographically prove to a certificate authority (CA) that a cryptographic key (e.g., an RSA key) in the certificate request is protected by a TPM (or the TPM) that the CA trusts.

With TPM key attestation, a hypervisor/operating system can define the set of processes that can access specific protected resources (MRENCLAVE) and have strong guarantees that no other devices can be used to access them. This access control paradigm is strong because it is tied to a hardware-bound user identity, which is generally stronger than a software-based credential.

As noted above, some embodiments may rely on two major operations:

1) Secure handshake initialization
2) Secure handshake attestation protocol

With regard to the secure handshake initialization, the initialization phase may precede deployment of the nodes, and hence it may be assumed that nodes have not been compromised at this stage. A hypervisor may pre-configure the TPM (e.g., by loading RSA key pairs into the TPM). Before two nodes can communicate with each other securely, a shared secret may be needed, and this may be established by the hypervisor. Each node may establish the shared secrets dynamically with its secure cluster, which allows scalability during the VM migration process.

All nodes in a cluster may contain a secure MRENCLAVE, which will be managed by the cluster. This may be leveraged for moving critical intellectual property securely during the application migration process.

Figure 3:
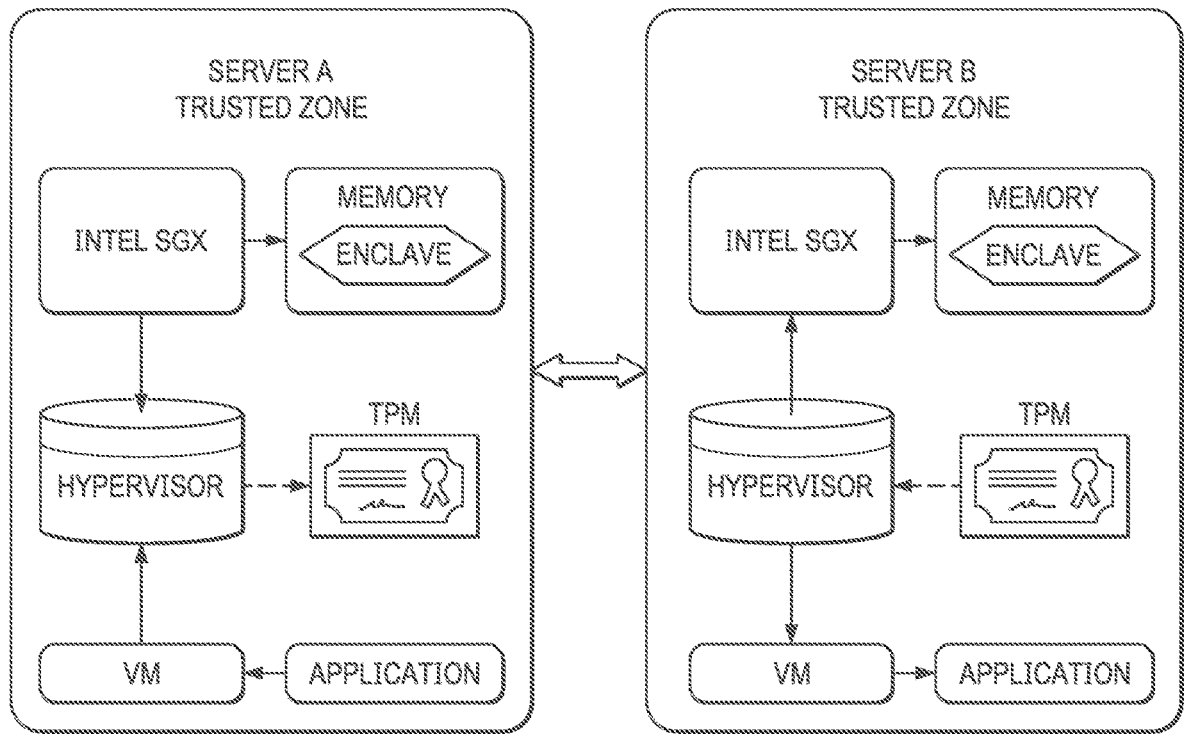
FIG. 3 illustrates a block diagram of an example architecture, in accordance with embodiments of the present disclosure.
Figure 4:
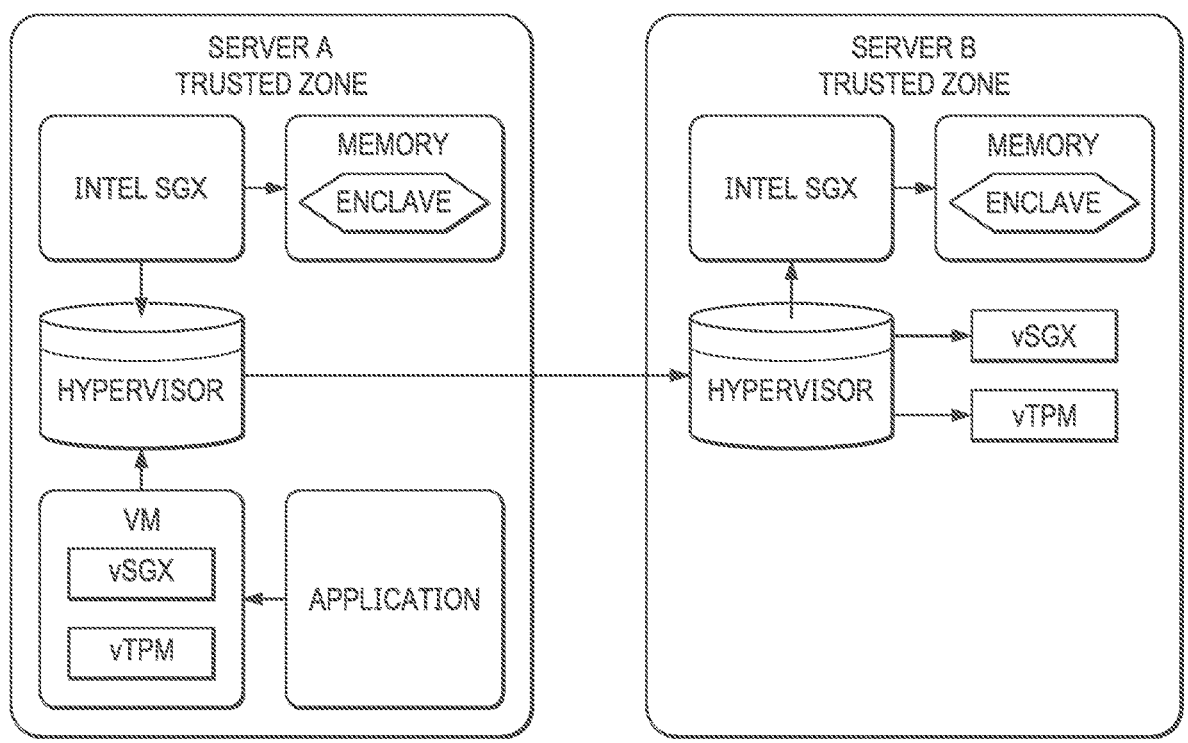
FIG. 4 illustrates a block diagram of an example architecture, in accordance with embodiments of the present disclosure.

FIG. 3 illustrates a situation in which a TPM is available and is used. FIG. 4 illustrates an analogous situation, but in which a TPM is not used, and instead a vTPM and virtual SGX (vSGX) may be employed. In these and other examples described herein, two hosts are shown for the sake of concreteness and exposition. In other embodiments, as one of ordinary skill in the art with the benefit of this disclosure will understand, different numbers of hosts may also be employed.

In FIG. 3, the secure handshake protocol may be performed with a secret attestation key from the TPM. This may be enabled by Server A and Server B checking (e.g., during cluster creation) whether or not the host capability bit for SGX/TPM is set. If those capability bits are set, then Servers A and B may participate and are added into a secure cluster zone.

In FIG. 4, the secure handshake protocol may be performed for systems without a TPM. If no TPM is present, the host hypervisors may enable vTPM and use the vTPM to be added into the secure cluster zone. In some embodiments, the vTPM measurements may be securely stored in a vSGX enclave to enhance security.

With regard to the secure handshake attestation protocol mentioned above, once initialization is performed, all nodes of the cluster may be in a secure zone, and a root of trust may be created. An explanation of an example procedure is described below.

1) Node A may create a non-predictable nonce (e.g., via the use of a random or pseudorandom number generator, or via any other suitable technique) and send it along with the Node A identity to Node B.

2) Node B may respond with a 'Hello' type message containing another non-predictable nonce generated by Node B and Node B's certificate signed by a trusted CA.

3) The message that Node B sends to Node A may be used as a key exchange mechanism.

4) Node A may send a measurement list (ML) including platform configuration register (PCR) data from its TPM, along with a session secret encrypted with Node A's public key. The client may own a pair of public/private keys (e.g., RSA keys) referred to as attestation identity keys (AIK) that may be generated by a TPM. It may also obtain an AIK certificate which contains the AIK public key signed by a trusted CA. The client may send this AIK certificate to the server to authenticate itself.

5) Node B may send a TPM quote response to the server. In order to obtain a TPM quote from the TPM, the client may send a hash of the two nonces and the session secret to the TPM and request a quote signed by the AIK. The TPM may return a signature over the PCR values and a given hash by the AIK private key.

6) Node B may then validate whether Node A's AIK certificate was signed by a trusted CA and belongs to a genuine TPM. Then it may verify the freshness of the quote response by comparing the hash of nonces and secret with the signed hash. Then it may validate the integrity of the ML by verifying the hash of the ML against the PCR value(s) in the signature.

7) Lastly, Node B may validate individual entries in the ML by comparing the hashes against acceptable values.

8) If the integrity of the Node A platform is trusted by Node B in the above step, then the protocol exchange is complete.

Figure 5A:
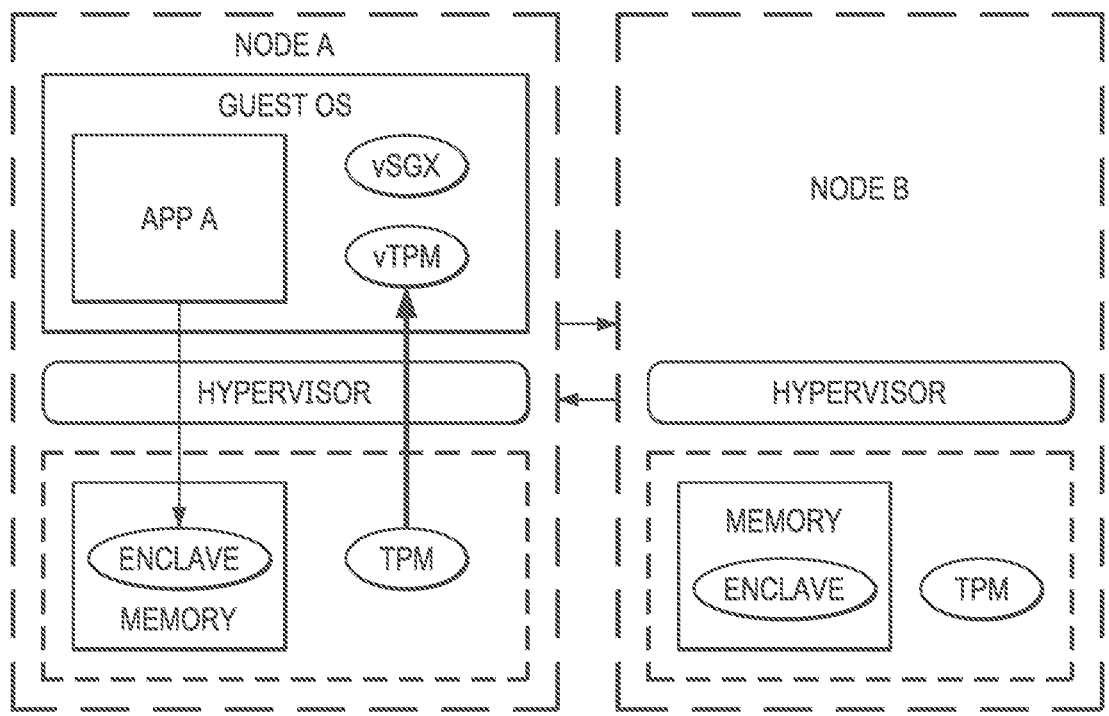
FIG. 5A illustrates a first view of an example application migration, in accordance with embodiments of the present disclosure.

Turning now to FIG. 5A, an example embodiment of a secure application transfer is shown. At the beginning of the transfer process, Application A is running within a guest OS on Node A.

To begin the transfer, the vTPM of the guest OS may perform a measurement of the guest OS's SGX enclave and store it in encrypted space. The physical TPM (pTPM) of Node A may perform a measurement of Node A, extending its PCRs and updating the guest OS integrity measurements.

Figure 7:
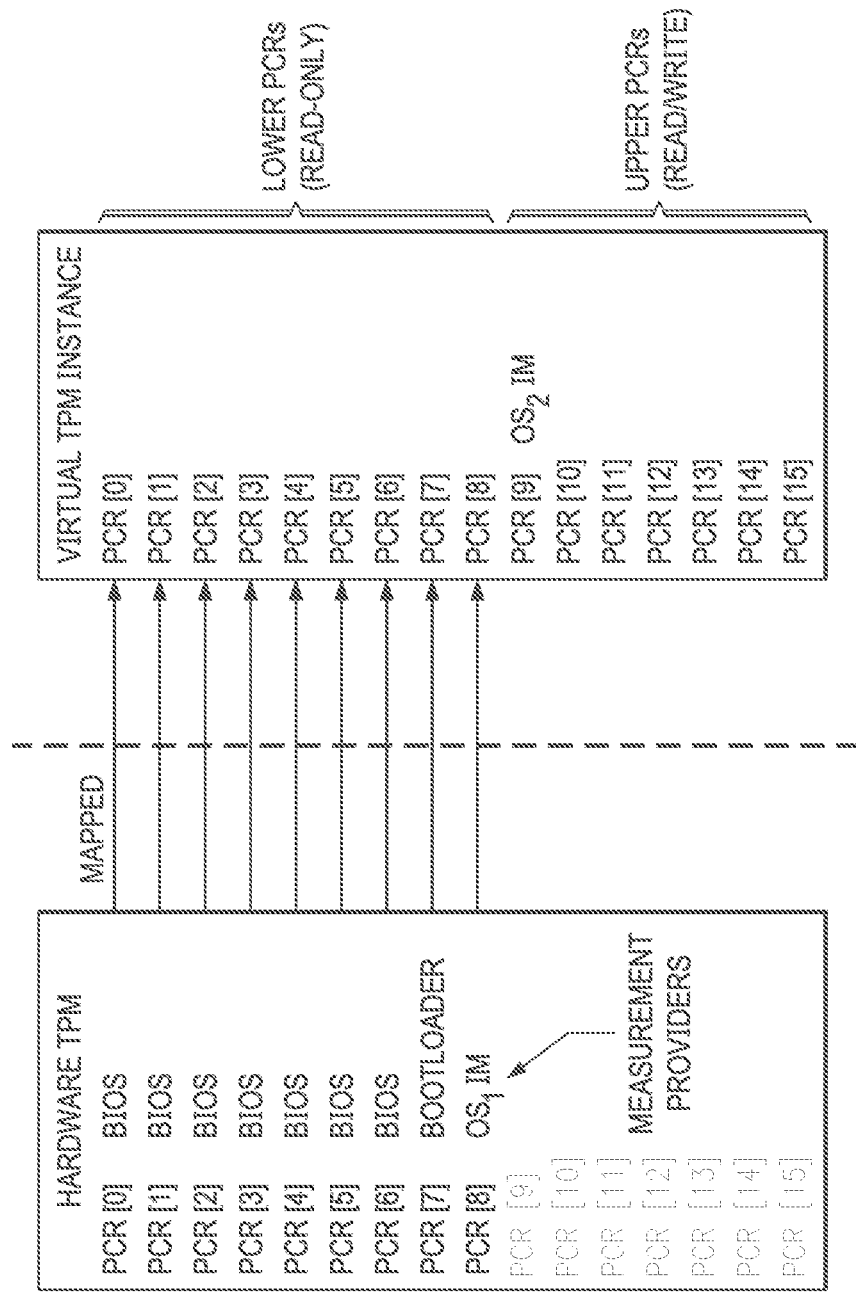
FIG. 7 illustrates a set of platform configuration registers (PCRs), in accordance with embodiments of the present disclosure.

With momentary reference to FIG. 7, an example list of PCRs is shown, in accordance with some embodiments. In some embodiments, PCRs 10 through 15 may be used for these purposes.

Turning now back to FIG. 5A, a VM migration may then be triggered to transfer the guest OS (along with Application A) from Node A to Node B. Node A may perform a remote attestation of the PCRs to verify the integrity of the guest OS with Node B's TPM. Node B may load the VM and measure the PCRs to validate that the guest OS is not compromised.

Figure 5B:
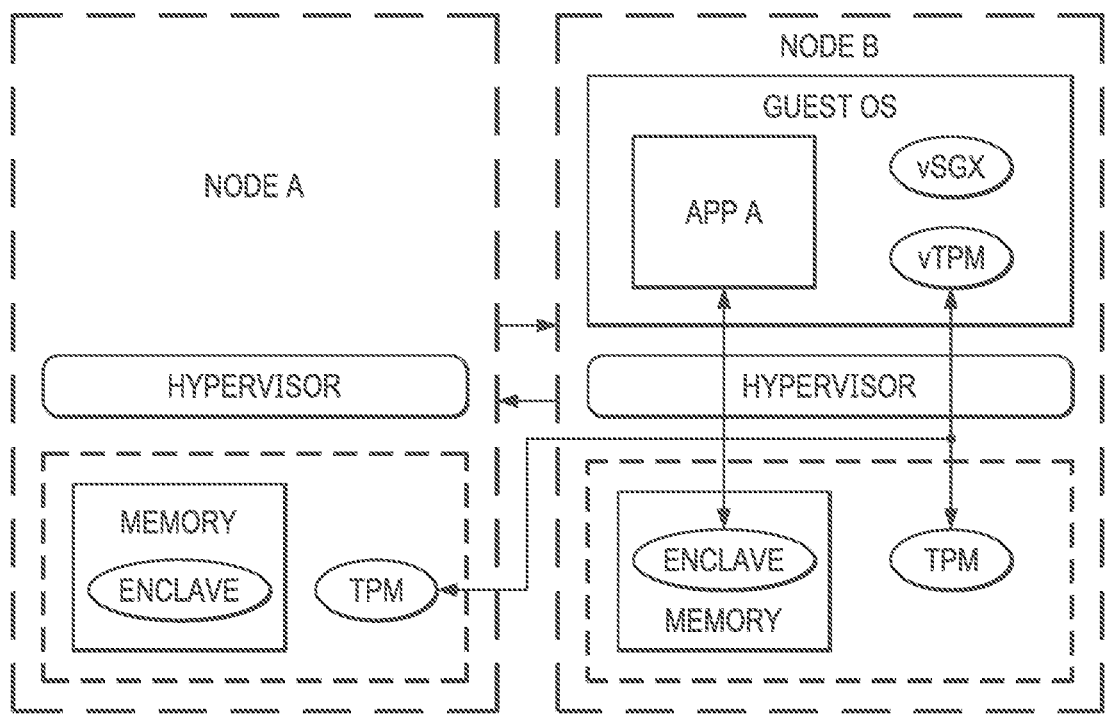
FIG. 5B illustrates a second view of an example application migration, in accordance with embodiments of the present disclosure.

As shown in FIG. 5B, the guest OS and Application A may then be executed on Node B, and the secure enclave may be restored after the TPM attestation procedure.

Thus as described herein, in embodiments in which the nodes include a physical TPM, the attestation may be performed by a vTPM to pTPM across hosts before the migration is performed. In embodiments in which the nodes do not include a physical TPM, multiple possibilities are available. According to one embodiment, attestation may be performed by hypervisors using an emulated software TPM across the hosts. According to another embodiment, a TPM may be enabled via a management controller such as a BMC to provide attestation of hosts over a sideband communications bus across multiple hosts.

Accordingly, some embodiments may provide for the use of a vSGX Plugin for a guest OS. Further, some embodiments may provide for storing vTPM measurements in a vSGX enclave. Further, some embodiments may provide for extending SGX and providing remote attestation and provisioning the movement of secure applications in a datacenter.

Figure 6:
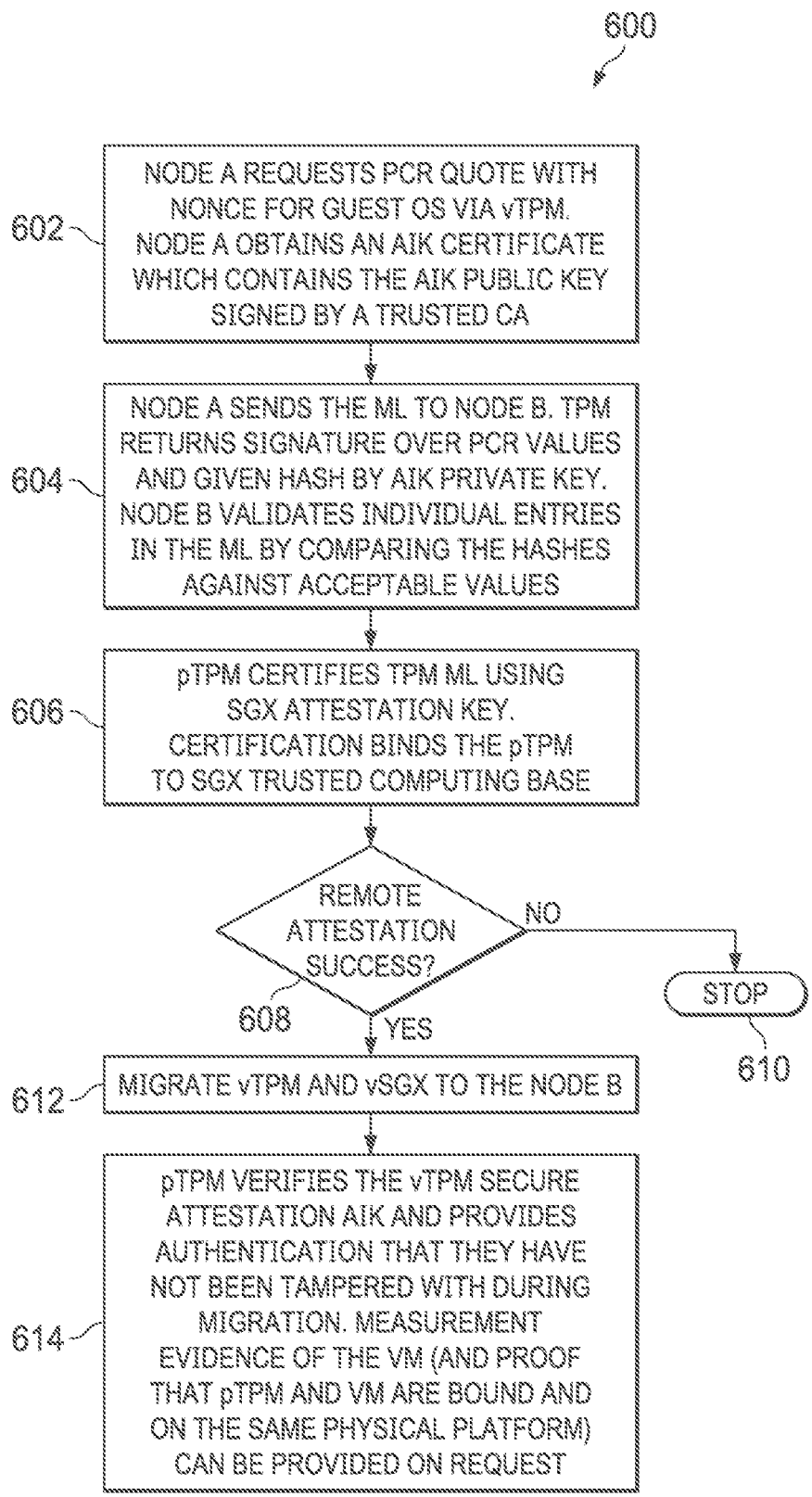
FIG. 6 illustrates an example method, in accordance with embodiments of the present disclosure.

Turning now to FIG. 6, a flow chart is shown of an example method 600 for secure migration of an application from Node A to Node B, in accordance with some embodiments.

At step 602, Node A may request a PCR quote with a nonce for a guest OS via a vTPM. Node A may obtain an AIK public key signed by a trusted CA.

At step 604, Node A may send a ML to Node B including PCR data from Node A. The TPM may return a signature over the PCR values and a given hash by the AIK private key. Node B may then validate individual entries in the ML by comparing the hashes against known acceptable values.

At step 606, the pTPM may certify the TPM ML using an SGX attestation key. This certification may bind the pTPM to the SGX trusted computing base.

At step 608, it may be determined whether the remote attestation procedure has succeeded. If not, the method may end at step 610. If so, then at step 612, the vTPM and vSGX may be migrated to Node B.

Finally at step 614, the pTPM may verify the vTPM secure attestation AIK and provide authentication that no tampering has occurred during the migration. Measurement evidence of the VM (as well as proof that the pTPM and VM are bound and on the same physical platform) may be provided if requested. After the completion of step 614, the secure migration procedure is complete.

One of ordinary skill in the art with the benefit of this disclosure will understand that the preferred initialization point for the method depicted in FIG. 6 and the order of the steps comprising that method may depend on the implementation chosen. In these and other embodiments, this method may be implemented as hardware, firmware, software, applications, functions, libraries, or other instructions. Further, although FIG. 6 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

As discussed herein, embodiments of this disclosure may provide many advantages over existing solutions. For example, a method may include extending security functionality such as SGX and providing remote attestation and provisioning the movement of secure applications in a datacenter. In these and other embodiments, a method may include dynamically building a list of protected secure zones across a cluster by periodically performing a secure handshake attestation during runtime. In these and other embodiments, a method may include leveraging a TPM for remote attestation as a hardware-based credential. In these and other embodiments, a method may include mitigating/recovering a blocklisted node that failed attestation and bringing it back into compliance (e.g., via period handshaking as mentioned above). In these and other embodiments, a method may include integrating hardware-based attestation as a supplement to software-based attestation.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory coupled to the at least one processor;
   wherein the information handling system is configured to:
      execute an application within a guest operating system (OS) on the at least one processor, wherein at least a portion of data of the application is stored encrypted in a secure enclave region of the memory; and
      securely transfer execution of the application to a second information handling system by:
         performing first measurements relating to the information handling system by a physical cryptoprocessor of the information handling system,
         performing second measurements relating to the guest OS by a virtual cryptoprocessor of the guest OS,
         determining platform configuration register (PCR) measurement data that is based on the first and second measurements,
         transmitting the PCR measurement data to the second information handling system, and
         transmitting the at least a portion of data of the application to the second information handling system;
      wherein the PCR measurement data is usable by the second information handling system to perform a remote attestation, the remote attestation including:
         verification of the PCR measurement data to confirm that the at least a portion of data of the application has not been changed, and
         verification that the guest OS and a physical cryptoprocessor of the second information handling system are bound and associated with a single physical platform.

2. The information handling system of claim 1, wherein the secure enclave region is based on Software Guard Extensions (SGX) of the at least one processor.

3. The information handling system of claim 1, wherein the information handling system and the second information handling system are nodes of a hyper-converged infrastructure (HCI) cluster.

4. The information handling system of claim 1, wherein a hypervisor is configured to execute the guest OS.

5. The information handling system of claim 1, wherein the physical cryptoprocessor is a Trusted Platform Module (TPM).

6. A method comprising:
   an information handling system executing an application within a guest operating system (OS) on at least one processor of the information handling system,
   wherein at least a portion of data of the application is stored encrypted in a secure enclave region of a memory of the information handling system; and
   the information handling system securely transferring execution of the application to a second information handling system by:
      performing first measurements relating to the information handling system by a physical cryptoprocessor of the information handling system,
      performing second measurements relating to the guest OS by a virtual cryptoprocessor of the guest OS,
      determining platform configuration register (PCR) measurement data that is based on the first and second measurements,
      transmitting the PCR measurement data to the second information handling system, and
      transmitting the at least a portion of data of the application to the second information handling system;
   wherein the PCR measurement data is usable by the second information handling system to perform a remote attestation, the remote attestation including:
      verification of the PCR measurement data to confirm that the at least a portion of data of the application has not been changed, and
      verification that the guest OS and a physical cryptoprocessor of the second information handling system are bound and associated with a single physical platform.

7. The method of claim 6, wherein the secure enclave region is based on Software Guard Extensions (SGX) of the at least one processor.

8. The method of claim 6, wherein the information handling system and the second information handling system are nodes of a hyper-converged infrastructure (HCI) cluster.

9. The method of claim 6, wherein the physical cryptoprocessor is a Trusted Platform Module (TPM).

10. An article of manufacture comprising a non-transitory, computer-readable medium having computer-executable code thereon that is executable by a processor of an information handling system for:
    executing an application within a guest operating system (OS) on the processor, wherein at least a portion of data of the application is stored encrypted in a secure enclave region of a memory of the information handling system; and
    securely transferring execution of the application to a second information handling system by:
       performing first measurements relating to the information handling system by a physical cryptoprocessor of the information handling system,
       performing second measurements relating to the guest OS by a virtual cryptoprocessor of the guest OS,
       determining platform configuration register (PCR) measurement data that is based on the first and second measurements,
       transmitting the PCR measurement data to the second information handling system, and
       transmitting the at least a portion of data of the application to the second information handling system;
    wherein the PCR measurement data is usable by the second information handling system to perform a remote attestation, the remote attestation including:
       verification of the PCR measurement data to confirm that the at least a portion of data of the application has not been changed, and
       verification that the guest OS and a physical cryptoprocessor of the second information handling system are bound and associated with a single physical platform.

11. The article of claim 10, wherein the secure enclave region is based on Software Guard Extensions (SGX) of the at least one processor.

12. The article of claim 10, wherein the information handling system and the second information handling system are nodes of a hyper-converged infrastructure (HCI) cluster.

13. The article of claim 10, wherein a hypervisor is configured to execute the guest OS.

14. The article of claim 10, wherein the physical crypto-processor is a Trusted Platform Module (TPM).

* * * * *